United States Patent
Kim et al.

(10) Patent No.: US 12,021,255 B2
(45) Date of Patent: Jun. 25, 2024

(54) SECONDARY BATTERY

(71) Applicant: Samsung SDI Co., Ltd., Yongin-si (KR)

(72) Inventors: Dae Kyu Kim, Yongin-si (KR); Shin Jung Kim, Yongin-si (KR); Jong Jun Park, Yongin-si (KR); Sung Gwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/846,912

(22) Filed: Jun. 22, 2022

(65) Prior Publication Data

US 2023/0006303 A1     Jan. 5, 2023

(30) Foreign Application Priority Data

Jun. 30, 2021 (KR) .................. 10-2021-0085718

(51) Int. Cl.
*H01M 50/333* (2021.01)
*H01M 50/186* (2021.01)
*H01M 50/317* (2021.01)

(52) U.S. Cl.
CPC ....... *H01M 50/333* (2021.01); *H01M 50/186* (2021.01); *H01M 50/317* (2021.01)

(58) Field of Classification Search
CPC ........... H01M 50/317–333; H01M 50/35–367; H01M 50/10–198; H01M 50/30–394
See application file for complete search history.

(56) References Cited

U.S. PATENT DOCUMENTS

| | | |
|---|---|---|
| 6,326,100 B1 | 12/2001 | Han et al. |
| 10,644,298 B2 | 5/2020 | Kim et al. |
| 11,532,850 B2 | 12/2022 | Jang et al. |
| 2002/0086201 A1 | 7/2002 | Payen et al. |
| 2008/0166625 A1* | 7/2008 | Schembri ............ H01M 50/308 429/53 |
| 2018/0254468 A1 | 9/2018 | Kim et al. |
| 2020/0303700 A1 | 9/2020 | Park et al. |
| 2021/0175576 A1 | 6/2021 | Jang et al. |

FOREIGN PATENT DOCUMENTS

| | | | | |
|---|---|---|---|---|
| CN | 203553251 U | * | 4/2014 | ............. Y02E 60/10 |
| CN | 104064704 A | * | 9/2014 | .......... H01M 2/1205 |
| CN | 110391381 A | * | 10/2019 | ............ H01M 2/043 |

(Continued)

OTHER PUBLICATIONS

Machine translation of Yin, CN 104064704. Originally available Sep. 2014. (Year: 2014).*

(Continued)

*Primary Examiner* — Jonathan Crepeau
*Assistant Examiner* — Jacob Buchanan
(74) *Attorney, Agent, or Firm* — Lewis Roca Rothgerber Christie LLP

(57) ABSTRACT

A secondary battery includes: an electrode assembly; a case including an opening and accommodating the electrode assembly; a cap assembly sealing the opening of the case and having a valve hole formed therein; and a valve vertically movably installed in the valve hole and selectively openable and closeable, to allow an internal gas to be discharged.

8 Claims, 5 Drawing Sheets

(56) References Cited

FOREIGN PATENT DOCUMENTS

| CN | 111200090 | A | * | 5/2020 | .......... H01M 50/147 |
|---|---|---|---|---|---|
| CN | 112103414 | A | * | 12/2020 | .......... H01M 10/052 |
| JP | 2000-311670 | A | | 11/2000 | |
| JP | 2000311670 | A | * | 11/2000 | .............. H01M 2/12 |
| JP | 2010-135247 | A | | 6/2010 | |
| KR | 2002-0092625 | A | | 12/2002 | |
| KR | 10-2009-0059777 | | | 6/2009 | |
| KR | 10-1221101 | | | 1/2013 | |
| KR | 10-2017-0055113 | A | | 5/2017 | |
| KR | 10-2019-0072403 | A | | 6/2019 | |
| KR | 10-2020-0013989 | A | | 2/2020 | |
| KR | 10-2198047 | | | 1/2021 | |

OTHER PUBLICATIONS

Machine translation of Su, CN 111200090. Originally available May 2020. (Year: 2020).*
Machine translation of Kan, JP 2000311670. Originally available Nov. 2000. (Year: 2000).*
Machine translation of Jian, CN 110391381. Originally available Oct. 29, 2019 (Year: 2019).*
Machine translation of Li, CN 112103414. Originally available Dec. 18, 2020 (Year: 2020).*
Machine translation of Liu, CN 203553251. Originally available Apr. 16, 2014 (Year: 2014).*
Korean Office Action dated May 9, 2023, issued in corresponding Korean Patent Application No. 10-2021-0085718 (4 pages).
Korean Office Action dated Nov. 6, 2023, issued in corresponding Korean Patent Application No. 10-2021-0085718 (4 pages).
Korean Notice of Allowance dated Apr. 27, 2024, issued in corresponding Korean Patent Application No. 10-2021-0085718 (7 pages).

* cited by examiner

SECONDARY BATTERY

CROSS-REFERENCE TO RELATED APPLICATION

This application claims priority to and the benefit of Korean Patent Application No. 10-2021-0085718, filed on Jun. 30, 2021 in the Korean Intellectual Property Office, the entire content of which is herein incorporated by reference.

BACKGROUND

1. Field

Aspects of embodiments of the present disclosure relate to a secondary battery.

2. Description of the Related Art

Unlike primary batteries which are not rechargeable, secondary batteries can be charged and discharged. Low-capacity secondary batteries are widely employed in small-sized portable electronic devices, such as smartphones, feature phones, tablet computers, notebook computers, digital cameras, camcorders, etc., while large-capacity secondary batteries are typically used for driving motors of hybrid automobiles, electric automobiles, etc.

The secondary battery may include an electrode assembly including positive and negative electrodes, a case, or can, that accommodates the electrode assembly, terminals connected to the electrode assembly, and other components. Secondary batteries may be classified into cylindrical, prismatic type, and pouch types, according to the shape.

The above information disclosed in this Background section is provided for enhancement of understanding of the background of the invention and, therefore, it may contain information that does not constitute prior art.

SUMMARY

According to an aspect of embodiments of the present disclosure, a secondary battery capable of discharging internal gas in a secondary battery assembly process is provided.

A secondary battery according to one or more embodiments of the present disclosure comprises: an electrode assembly; a case including an opening and accommodating the electrode assembly; a cap assembly sealing the opening of the case and having a valve hole formed therein; and a valve vertically movably installed in the valve hole and selectively openable and closeable, to allow an internal gas to be discharged.

In one or more embodiments, the valve may include a shaft arranged through the valve hole; the shaft has a first opening on a lower outer circumferential surface, a second opening on an upper end surface, and a passage connecting the first opening and the second opening, and the valve is movable between a closed position, in which the first opening is closed in contact with an inner circumferential surface of the valve hole, and an open position, in which the shaft is moved downward from the closed position, and first opening is positioned below the valve hole and is opened.

In one or more embodiments, the valve may include a first flange protruding in a radial direction from an upper end of the shaft.

In one or more embodiments, the valve may include a second flange protruding in a radial direction from a lower end of the shaft.

In one or more embodiments, the valve may include a spring to bias the shaft into the closed position.

In one or more embodiments, the secondary battery may further include a first sealing member between the valve hole and the shaft.

In one or more embodiments, the secondary battery may further include a second sealing member between the valve hole and the second flange.

In one or more embodiments, the shaft may be rotatably installed in the valve hole, and, when the shaft is in the closed position, a key formed therein may protrude in a radial direction at a location above the valve hole, and the cap assembly may include a key groove configured to accommodate the key such that the shaft is movable up and down when the shaft rotates at a certain angle with respect to the valve hole.

DETAILED DESCRIPTION

Figure 1:
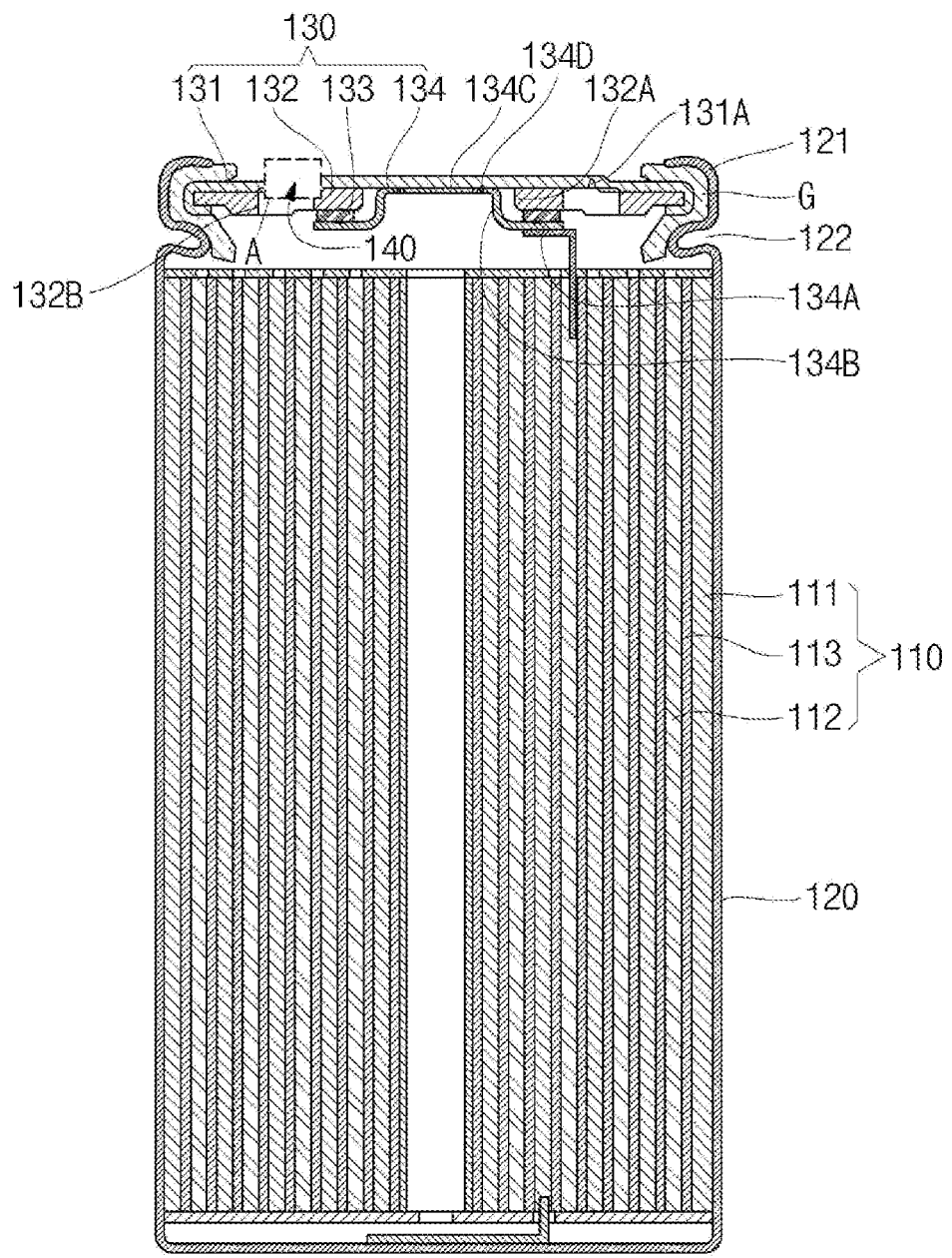
FIG. 1 is a schematic diagram of a secondary battery according to an embodiment of the present disclosure.

Herein, some example embodiments of the present disclosure will be described in further detail with reference to the accompanying drawings.

Some example embodiments of the present disclosure are provided to more completely explain the present disclosure; however, the present disclosure may be embodied in many different forms and should not be construed as being limited to the example embodiments set forth herein. Rather, these example embodiments are provided so that this disclosure will be thorough and complete and will convey aspects and features of the present disclosure to a person skilled in the art.

In addition, in the accompanying drawings, sizes or thicknesses of various components may be exaggerated for reasons of clarity. Like reference numerals refer to like elements throughout. As used herein, the term "and/or" includes any and all combinations of one or more of the associated listed items. In addition, it is to be understood that when an element A is referred to as being "connected to" an element B, the element A can be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 2:
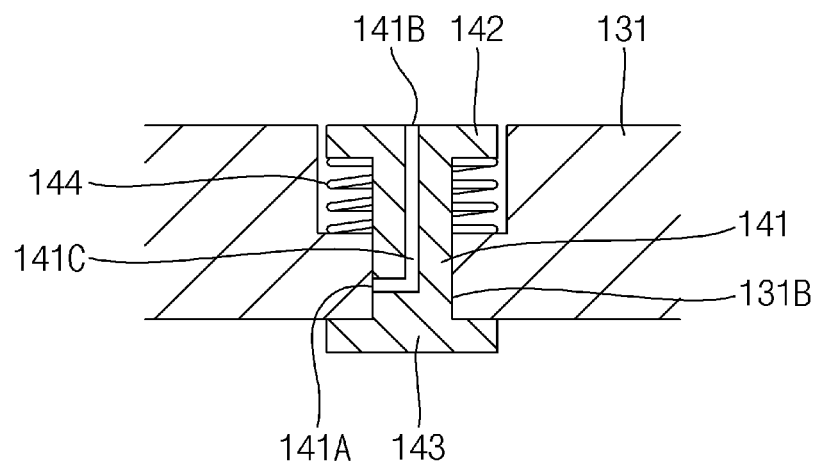
FIG. 2 is an enlarged view of a region "A" in FIG. 1, showing a state in which a valve is in a closed position.

FIG. 1 is a schematic diagram of a secondary battery 100 according to an embodiment of the present disclosure; FIG. 2 is an enlarged view of a region "A" in FIG. 1, showing a state in which a valve 140 is in a closed position; and FIG. 3 shows a state in which the valve 140 shown in FIG. 2 is moved to an open position.

Figure 3:
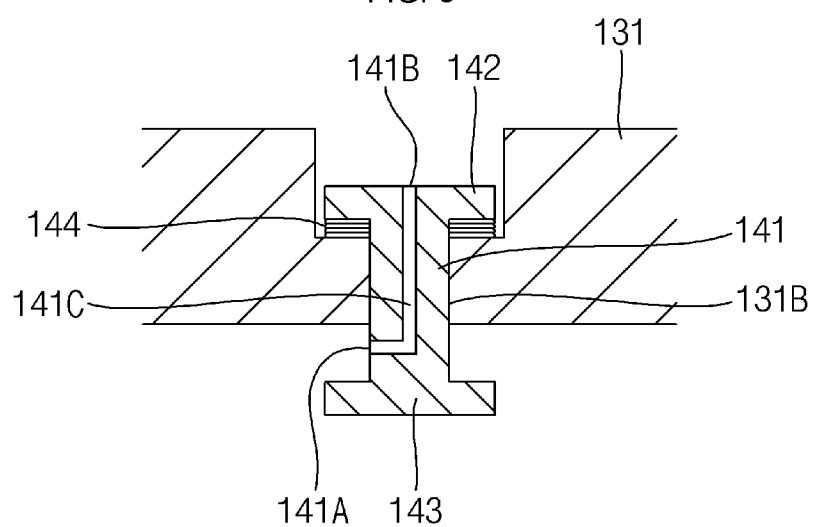
FIG. 3 shows a state in which the valve shown in FIG. 2 is moved to an open position.

Referring to FIGS. 1 to 3, the secondary battery 100 includes an electrode assembly 110, a case, or a can, 120, a cap assembly 130, and a valve 140. For reference, with respect to the valve 140, only a schematic position (region "A") is shown in FIG. 1 for reasons of clarity, and for purposes of description of the valve 140, reference will be made to FIGS. 2 and 3.

The electrode assembly 110 includes a first electrode plate 111, a second electrode plate 112, and a separator 113.

The first electrode plate 111 may be any one of a negative electrode plate and a positive electrode plate. When the first electrode plate 111 is a negative electrode plate, the first electrode plate 111 may include, for example, but is not limited to, a negative electrode coating portion on which a negative electrode active material is coated, and a negative electrode non-coating portion on which a negative electrode active material is not coated, on a negative electrode current collector plate made of a conductive metal thin plate composed of, for example, copper or nickel foil or mesh. Here, the negative electrode active material may be made of, for example, but is not limited to, a carbon-based material, Si, Sn, tin oxide, a tin alloy composite, a transition metal oxide, lithium metal nitrite, or a metal oxide.

The second electrode plate 112 may be the other one of the negative electrode plate and the positive electrode plate. As described above, when the first electrode plate 111 is a negative electrode plate, the second electrode plate 112 is a positive electrode plate. In this case, the second electrode plate 112 may include, for example, but is not limited to, a positive electrode coating portion on which a positive electrode active material is coated, and a positive electrode non-coating portion on which a positive electrode active material is not coated, on a positive electrode current collector plate made of a conductive metal thin plate composed of, for example, aluminum foil or mesh. Here, the positive electrode active material may be made of, for example, but is not limited to, a chalcogenide compound, for example, a composite metal oxide, such as $LiCoO_2$, $LiMn_2O_4$, $LiNiO_2$, or $LiNiMnO_2$.

The separator 113 is interposed between the first electrode plate 111 and the second electrode plate 112 to prevent or substantially prevent a short circuit between the first electrode plate 111 and the second electrode plate 112. The separator 113 may be made of, for example, but is not limited to, polyethylene, polypropylene, a porous copolymer of polyethylene and polypropylene, or the like. In an embodiment, the separator 113 may be formed to be larger than the first electrode plate 111 and the second electrode plate 112 in order to effectively prevent or substantially prevent a short circuit between the first electrode plate 111 and the second electrode plate 112.

In an embodiment, the electrode assembly 110 is wound in the form of a jelly roll.

The case 120, which, in an embodiment, is shaped of a cylinder having an opening (e.g., an open top surface), accommodates the electrode assembly 110 and is closed by the cap assembly 130. To this end, in an embodiment, the case 120 has a crimping part 121 that has an upper end bent more inward than the cap assembly 130, such that the cap assembly 130 is fixed so as not to be separated upward, and a beading part 122 that has a lower portion bent more inward than the cap assembly 130, such that the cap assembly 130 is supported so as not to move downward. A gasket G is installed between the can 120 and the cap assembly 130 to insulate the case 120 and the cap assembly 130. The case 120 may be electrically connected to the first electrode plate 111 of the electrode assembly 110 through the bottom thereof.

The cap assembly 130 seals the case 120, as described above. In addition, the cap assembly 130 includes a top plate 131, a support plate 132, an insulating plate 133, and a bottom plate 134.

In an embodiment, the top plate 131 is formed in a substantially circular plate shape. In an embodiment, the top plate 131 has a notch 131A formed therein. Therefore, when the pressure due to an internal gas is greater than a certain pressure (e.g., a preset pressure), the top plate 131 is broken around the notch 131A by the pressure, such that the internal gas can be quickly discharged. The top plate 131 has a valve hole 131B for installing the valve 140 (see FIGS. 2 and 3), and the valve 140 is installed and operated in the valve hole 131B, which will later be explained in further detail.

The support plate 132 is disposed under the top plate 131. The support plate 132 may be formed to have greater rigidity than the top plate 131, for example, to be thicker than the top plate 131. Accordingly, by supporting/reinforcing the top plate 131 by the support plate 132, the top plate 131 can be prevented or substantially prevented from being improperly deformed by an external impact. The support plate 132 may have a first through hole 132A formed at a center thereof. The first through hole 132A provides a passage through which the bottom plate 134 is coupled to the top plate 131. In addition, in the support plate 132, at least one second through hole 132B may be formed around the first through hole 132A. The second through hole 132B provides a passage for the internal gas to pass therethrough. Accordingly, a pressure due to the internal gas may act on the top plate 131 through the second through hole 132B. If the pressure is greater than a certain pressure (e.g. a preset pressure), the top plate 131 is broken around the notch 131A by the pressure, as described above. At least a portion of the second through hole 132B communicates with the valve hole 131B of the top plate 131. Accordingly, when the valve 140 is opened, the internal gas may be discharged through the second through hole 132B and the valve 140.

The insulating plate 133 is disposed between the support plate 132 and the bottom plate 134 to insulate the support plate 132 and the bottom plate 134. The insulating plate 133 may be formed in an annular shape along a corresponding area between the first through hole 132A and the second through hole 132B so as not to block the first and second through holes 132A and 132B of the support plate 132.

The bottom plate 134 is disposed under the insulating plate 133 and is electrically connected to the top plate 131. In an embodiment, the bottom plate 134 may include a first region 134A in contact with the insulating plate 133, a second region 134B bent from the first region 134A and positioned in the first through hole 132A of the support plate 132, and a third region 134C extending from the second region 134B to be in contact with the top plate 131. In this case, the bottom plate 134 may be electrically connected to the second electrode plate 112 of the electrode assembly 110 through the first region 134A. In an embodiment, in the bottom plate 134, a notch 134D is formed between the second region 134B and the third region 134C. Therefore, when the pressure due to the internal gas is greater than a certain pressure (e.g., a preset pressure), the bottom plate 134 is broken around the notch 134D by the pressure, such that the second region 134B and the third region 134C are separated from each other, thereby blocking the flow of current.

The valve 140 is installed in the valve hole 131B of the top plate 131 of the cap assembly 130 and can be selectively opened and closed. In an embodiment, the valve 140 includes a shaft 141, a first flange 142, a second flange 143, and a spring 144 (see FIGS. 2 and 3).

The shaft 141 is disposed through the valve hole 131B and is installed to be movable up and down. In an embodiment, an outer diameter of the shaft 141 is formed to be substantially the same as, or slight smaller than, an inner diameter of the valve hole 131B to allow smooth sliding motion. In an embodiment, the shaft 141 has a first opening 141A formed on a lower outer circumferential surface, a second opening 141B formed on an upper end surface, and a passage 141C formed inside to connect the first opening 141A and the second opening 141B. FIGS. 2 and 3 illustrate that the passage 141C extends in a radial direction from the first opening 141A and extends in a longitudinal direction near a center of the shaft 141 to the second opening 141B.

In an embodiment, a diameter of the first opening 141A is formed to be smaller than a depth or a length of the valve hole 131B. Therefore, as shown in FIG. 2, the shaft 141 moves relatively upward such that the first opening 141A comes into contact with the inner circumferential surface of the valve hole 131B, thereby closing the valve 140 (herein, this position is referred to as a "closed position"). In addition, as shown in FIG. 3, the shaft 141 moves downward from the closed position such that the first opening 141A is located below the valve hole 131B beyond the valve hole 131B, thereby opening the valve 140 (herein, this position is referred to as an "open position").

The first flange 142 protrudes in the radial direction from the upper end of the shaft 141. Therefore, when the shaft 141 moves from the closed position to the open position, the first flange 142 is constrained in the valve hole 131B, thereby further moving the shaft 141 downward to prevent the shaft 141 from being separated from the valve hole 131B.

Likewise, the second flange 143 protrudes in the radial direction from the lower end of the shaft 141. Therefore, when the shaft 141 moves from the open position to the closed position, the second flange 143 is below the valve hole 131B, thereby further moving the shaft 141 upward to prevent the shaft 141 from being separated from the valve hole 131B.

The spring 144 serves to urge the shaft 141 into the closed position. Therefore, when an external force is removed after the shaft 141 moves from the closed position to the open position by the external force, the shaft 141 automatically returns to the closed position by the spring 144.

On the basis of the configuration described above, a method of discharging an internal gas by using the valve 140 in the secondary battery 100 according to an embodiment of the present disclosure will be described below.

In a specific process during manufacture of the secondary battery 100, it is desired to discharge an internal gas. In this case, an operator may press the valve 140 downward. Accordingly, the shaft 141 moves downward such that the first opening 141A is located below the valve hole 131B beyond the valve hole 131B, such that the valve 140 is opened, thereby discharging the internal gas through the second through hole 132B of the support plate 132 and the valve 140.

Thereafter, when the operator releases the valve 140 after sufficiently discharging the internal gas, the shaft 141 moves upward by the spring 144 such that the first opening 141A comes into contact with an inner circumferential surface of the valve hole 131B, thereby closing the valve 140 again.

Figure 4:
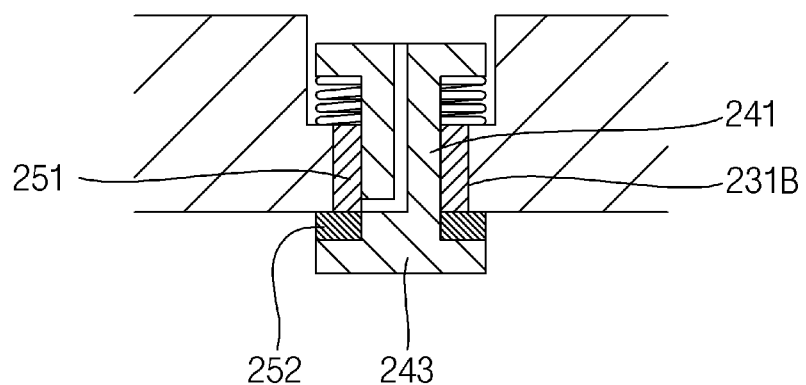
FIG. 4 is a view corresponding to FIG. 2, showing a state in which a valve is in a closed position in a secondary battery according to another embodiment of the present disclosure.
Figure 5:
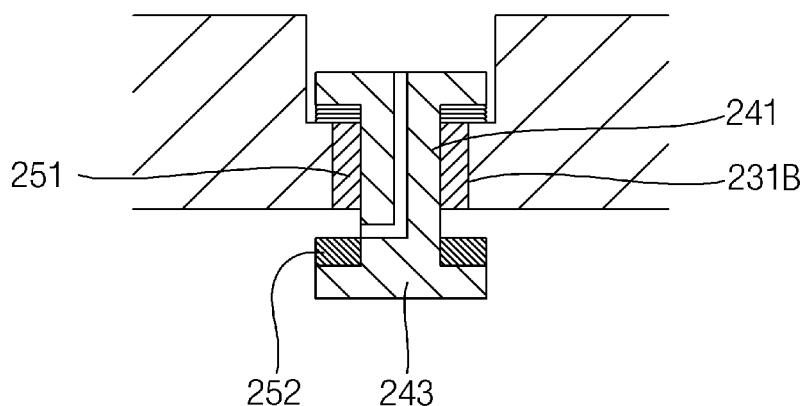
FIG. 5 shows a state in which the valve shown in FIG. 4 is moved to an open position.

FIG. 4 is a view corresponding to FIG. 2, showing a state in which a valve is in a closed position in a secondary battery according to another embodiment of the present disclosure; and FIG. 5 shows a state in which the valve shown in FIG. 4 is moved to an open position.

While in the secondary battery 100 according to an embodiment of the present disclosure, the inner diameter of the valve hole 131B of the top plate 131 of the cap assembly 130 is substantially the same as the outer diameter of the shaft 141 of the valve 140, a secondary battery according to another embodiment of the present disclosure differs from the secondary battery 100 in that an inner diameter of a valve hole 231B is larger than an outer diameter of a shaft 241, and a first sealing member 251 is installed between the valve hole 231B and the shaft 241. FIGS. 4 and 5 illustrate that the first sealing member 251 is formed in an annular shape and is fixed to an inner circumferential surface of the valve hole 231B. However, the first sealing member 251 may also be fixed to an outer circumferential surface of the shaft 241.

The first sealing member 251 may be formed of, for example, a rubber material. Accordingly, the inner diameter of the first sealing member 251 may be formed to be substantially the same as or slightly smaller than the outer diameter of the shaft 241, and, as the shaft 241 is inserted into the first sealing member 251 by fitting or interference fit, the valve hole 231B and the shaft 241 are in close contact with each other, thereby preventing or substantially preventing a gap from occurring therebetween.

In addition, in the secondary battery according to an embodiment of the present disclosure, a second sealing member 252 is installed between the valve hole 231B and a second flange 243. FIGS. 4 and 5 illustrate that the second sealing member 252 is formed in an annular shape and is fixed on the second flange 243. However, the second sealing member 252 may also be fixed around the valve hole 231B. The second sealing member 252 may also be formed of, for example, a rubber material. Accordingly, when the valve is in the closed position, the valve hole 231B and the second flange 243 may be in close contact with each other, thereby preventing or substantially preventing a gap from occurring therebetween.

In the secondary battery according to an embodiment of the present disclosure, other components may be substantially the same as those of the secondary battery 100 according to the above-described embodiment of the present disclosure, and, thus, a redundant description thereof will be omitted.

Figure 6:
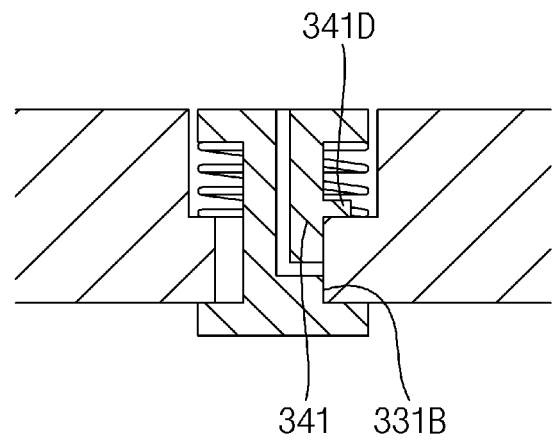
FIG. 6 is a view corresponding to FIG. 2, showing a state in which a valve is in a closed position in a secondary battery according to another embodiment of the present disclosure.
Figure 7:
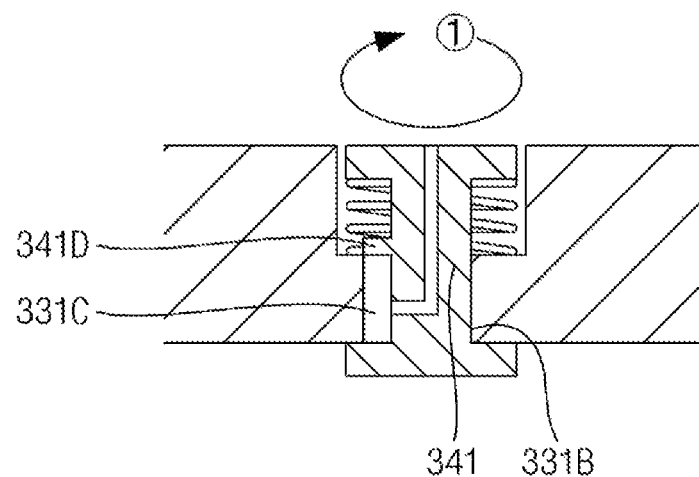
FIG. 7 shows a state in which the valve shown in FIG. 6 is rotated to move to an open position.

FIG. 6 is a view corresponding to FIG. 2, showing a state in which a valve is in a closed position in a secondary battery according to another embodiment of the present disclosure; FIG. 7 shows a state in which the valve shown in FIG. 6 is rotated to move to an open position; and FIG. 8 shows a state in which the valve shown in FIG. 7 is moved to an open position.

When the secondary battery according to another embodiment of the present disclosure is compared with the secondary battery 100 according to the above-described embodiment of the present disclosure, a difference exists with respect to comprising a key 341D and a key groove 331C. Other components may be substantially the same as those of the secondary battery 100 according to the above-described embodiment of the present disclosure, and, thus, a redundant description thereof will be omitted.

Figure 8:
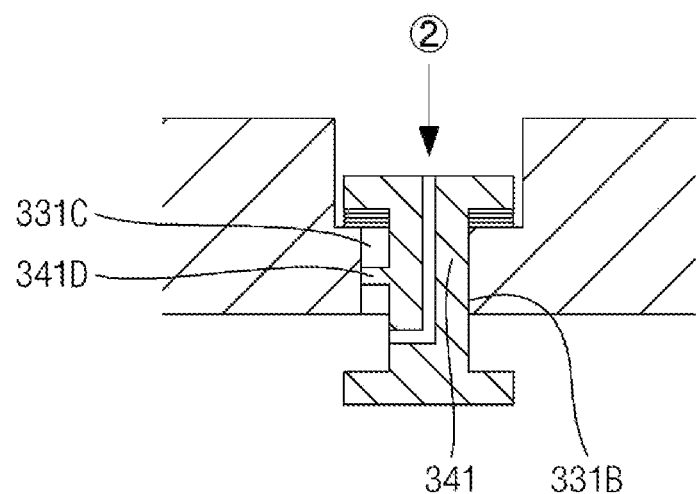
FIG. 8 shows a state in which the valve shown in FIG. 7 is moved to an open position.

Referring to FIGS. 6 to 8, in the secondary battery according to another embodiment of the present disclosure, a shaft 341 of a valve is vertically movably installed in a valve hole 331B of a top plate of a cap assembly, and is rotatably installed about a central axis thereof. In addition, when the shaft 341 is in a closed position, the key 341D is formed to protrude in a radial direction at a location above (e.g., immediately above) the valve hole 331B.

In an embodiment, the top plate has the key groove 331C capable of accommodating the key 341D so as to allow the shaft 341 to move up and down when the shaft 341 rotates at a specific angle with respect to the valve hole 331B.

Accordingly, as shown in FIG. 6, when the key 341D is not in a position corresponding to the key groove 331C in the closed position, the key 341D is restrained in the valve hole 331B, and the shaft 341 cannot move downward. Accordingly, the valve can be prevented from being opened by unintentionally moving the shaft 341 downward in the closed position.

To open the valve in such a state, the shaft 341 has to be rotated, for example, rotated clockwise (see FIG. 7) so as to allow the key 341D to reach a position corresponding to the key groove 331C, followed by pressing the shaft 341 (see FIG. 8). Accordingly, when the shaft 341 is released after sufficiently discharging an internal gas, the shaft 341 may move upward by a spring, and then the valve may be locked by rotating the shaft 341, for example, rotating counterclockwise (see FIG. 6).

Further, by combining the features of the first sealing member 251 and the second sealing member 252 in the secondary battery according to another embodiment of the present disclosure with the features of the key 341D and the key groove 331C in the secondary battery according to an embodiment of the present disclosure, a secondary battery according to a further embodiment of the present disclosure can be provided.

As described above, embodiments of the present disclosure provide a secondary battery in which, by installing a valve in a cap assembly, an operator can discharge internal gas by pressing the valve in a secondary battery assembling process.

While the foregoing embodiments have been described as example embodiments for carrying out the secondary battery according to the present disclosure, the present disclosure is not limited to the described embodiments, and it will be understood by a person skilled in the art that various changes in form and details may be made therein without departing from the spirit and scope of the present disclosure as set forth by the following claims.

What is claimed is:

1. A secondary battery comprising:
an electrode assembly;
a case comprising an opening and accommodating the electrode assembly;
a cap assembly sealing the opening of the case and having a valve hole formed therein; and
a valve vertically movably installed in the valve hole and selectively openable and closeable, to allow an internal gas to be discharged,
wherein the valve comprises a shaft arranged through the valve hole; the shaft comprises a first opening at a lower portion of the shaft, a second opening passing through an upper end surface of the shaft, and a passage connecting the first opening and the second opening, and the valve is movable between a closed position and an open position, in which the shaft is moved downward from the closed position, and the first opening is positioned below the valve hole and is opened.

2. The secondary battery of claim 1, wherein the first opening passes through a lower outer circumferential surface of the shaft, and, in the closed position, the first opening is closed in contact with an inner circumferential surface of the valve hole.

3. The secondary battery of claim 2, wherein the valve comprises a first flange protruding in a radial direction from an upper end of the shaft.

4. The secondary battery of claim 2, wherein the valve comprises a second flange protruding in a radial direction from a lower end of the shaft.

5. The secondary battery of claim 4, further comprising a second sealing member between the valve hole and the second flange.

6. The secondary battery of claim 2, wherein the valve comprises a spring to bias the shaft into the closed position.

7. The secondary battery of claim 2, further comprising a first sealing member between the valve hole and the shaft.

8. The secondary battery of claim 2, wherein the shaft is rotatably installed in the valve hole, and, when the shaft is in the closed position, a key formed therein protrudes in a radial direction at a location above the valve hole, and the cap assembly comprises a key groove configured to accommodate the key such that the shaft is movable up and down when the shaft rotates at a certain angle with respect to the valve hole.

\* \* \* \* \*